United States Patent [19]

Brazdil, Jr. et al.

[11] Patent Number: 4,883,895

[45] Date of Patent: * Nov. 28, 1989

[54] AMMOXIDATION OF PARAFFINS AND CATALYSTS THEREFOR

[75] Inventors: James F. Brazdil, Jr., Mayfield Village; Linda C. Glaeser, Lyndhurst; Mark A. Toft, Lakewood, all of Ohio

[73] Assignee: The Standard Oil Company, Cleveland, Ohio

[*] Notice: The portion of the term of this patent subsequent to Mar. 21, 2006 has been disclaimed.

[21] Appl. No.: 348,438

[22] Filed: May 8, 1989

Related U.S. Application Data

[62] Division of Ser. No. 250,654, Sep. 29, 1988.

[51] Int. Cl.$^4$ ............................................ C07C 120/14
[52] U.S. Cl. ..................................................... 558/319
[58] Field of Search ......................................... 558/319

[56] References Cited

U.S. PATENT DOCUMENTS

| | | | |
|---|---|---|---|
| 4,783,545 | 11/1988 | Glaeser et al. | 558/319 |
| 4,801,727 | 1/1989 | Glaeser et al. | 558/319 |
| 4,814,478 | 3/1989 | Glaeser et al. | 558/319 |

Primary Examiner—Joseph P. Brust
Attorney, Agent, or Firm—C. S. Lynch; D. J. Untener; L. W. Evans

[57] ABSTRACT

Disclosed is the reaction of propane and isobutane with $O_2$ and $NH_3$ to make $\alpha,\beta$-unsaturated nitriles and olefins, using certain complex metal oxide catalyst compositions and an excess of the paraffin over both the $O_2$ and the $NH_3$. Also disclosed are suitable catalyst compositions for such reactions.

4 Claims, No Drawings

AMMOXIDATION OF PARAFFINS AND CATALYSTS THEREFOR

This is a division of co-pending application Ser. No. 250,654 filed Sept. 29, 1988.

This invention relates to the catalytic ammoxidation of propane and isobutane to $\alpha,\beta$-unsaturated mononitriles; i.e., acrylonitrile and methacrylonitrile, and to catalyst compositions for such ammoxidation.

Because of the price differential between propylene and propane an economic incentive exists for the development of a viable catalytic process for conversion of propane to acrylonitrile.

In U.S. Pat. No. 3,433,823 is disclosed a process for reacting paraffins such as isobutane with oxygen and ammonia to make methacrylonitrile using a mixture of a first catalyst and a second catalyst. The first catalyst can be a vanadium phosphate and the second an oxide of Mo, Cu, W, Th, V or Zr. It is not disclosed, however, to use an excess ratio of isobutane to $O_2$. In the actual examples using isobutane as the substrate, a large excess of oxygen is used and the results are poor.

In Chemical Abstracts, Vol. 88:90239d is disclosed the reaction of propane with $NH_3$ and $O_2$ using excess $NH_3$ and excess $O_2$ and an oxide catalyst containing only V, P and O. Only 40.5 percent of the propane was converted, and only 29.4 percent of propane fed was converted to acrylonitrile.

An article in Applied Catalysis, 33 (1987) by Centi et al, on pages 343-359 discusses, inter alia, the ammoxidation of propane with very large excesses, which are totally uneconomical, of oxygen and ammonia over that require to stoichiometrically ammoxidize propane. The results are also very poor. The catalyst is $(VO)_2P_2O_7$.

It is an object of the present invention to provide an improved process for the ammoxidation of paraffins to unsaturated mononitriles and the corresponding mono-olefins.

It is a further object of the invention to provide new catalyst systems for such reaction.

Still another object is to provide an improved catalytic ammoxidation process for making certain unsaturated mononitriles and olefins (propylene and isobutylene) from lower paraffins without the use of halogen promoters.

Other objects, as well as aspects, features and advantages, of the present invention will become apparent from a study of the accompanying disclosure and the claims.

The foregoing and other objects of the present invention are achieved by the process of the present invention. There are two main features of the present process invention. The first of these is the use of an excess of the alkane feed with relation to $NH_3$ and molecular oxygen. The second feature, which is used in combination with the high ratio of the $C_3$ to $C_4$ paraffin to $NH_3$ and $O_2$, is that a combination, i.e., a mixture, of catalysts is employed, the first catalyst composition being especially effective to promote formation of an unsaturated nitrile and an olefin from the paraffin, and the second catalyst composition being especially effective to promote the conversion of the olefin to the unsaturated nitrile. Such mixture is the subject of the composition claims herein.

According to one aspect of the invention there is provided a process for making an $\alpha,\beta$-unsaturated mononitrile by the catalytic reaction in the vapor phase of a paraffin selected from propane and isobutane with molecular oxygen and ammonia and optionally a gaseous diluent, by catalytic contact of the foregoing reactants in a reaction zone with an intimate particulate mixture of a first catalyst composition and a second catalyst composition, the feed to said reaction zone containing a mole ratio of said paraffin:$NH_3$ in the range from 2 to 16 and a mole ratio of said paraffin to $O_2$ in the range from 1 to 10, said first catalyst composition being 0-99 weight percent of a diluent/support and 100-1 weight percent of a catalyst having the components in the proportions indicated by the empirical formula:

$$VP_pW_wA_aD_dC_cT_tO_x \text{ (formula 1)}$$

where
A is one or more of Sn, Mo, B and Ge;
D is one or more of Fe, Co, Ni, Cr, Pb, Mn, Zn, Se, Te, Ga, Zr, In and As;
C is one or more of an alkali metal and Tl;
T is one or more of Ca, Sr, Mg and Ba; and where
a is 0-10;
d is 0.10;
c is 0.1;
t is 0-10;
p is 0.1-20;
w is 0.2-10;
the ratio $(a+c+d+t+w):(1+p)$ is no more than 6; x is determined by the oxidation state of the other elements present; and no more than 2 atoms of Mo are present per atom of V; said second catalyst composition being 0-99 weight percent of a diluent/support and 100-1 weight percent of a catalyst having the components in the proportions indicated by the empirical formula:

$$Bi_kFe_lMo_{12}H_hE_eF_fG_gO_x \text{ (formula 2)}$$

where
H is one or more of an alkali metal, Sm, Ag
E is one or more of Mn, Cr, Cu, V, Zn, Cd, La,
F is one or more of P, As, Sb, Te, W, B, Sn, Pb, Se
G is one or more of Co, Ni, alkaline earth metal and
k is 0.1-12, l is 0.01-12,
h is 0-0.5,
e is 0-10,
f is 0-10,
g is 0-12,
$k+1+d+e+f+g \geq 24$, and
x is a number determined by the valence requirements of the other elements present, wherein the weight ratio in said mixture of said first catalyst composition to said second catalyst composition is in the range of 0.001 to 2.5.

In the present process when applied to propane ammoxidation a small amount of propylene is produced in relation to the unreacted propane in the effluent. Such propane effluent containing propylene in the amount of up to 8 mole percent, but usually no more than 6 mole percent, of the amount of propane plus propylene can comprise the substrate feed to the present process. And in general the alkane feed to the process can contain one or more $C_3$ to $C_4$ olefins. The $C_3$ to $C_4$ olefin content of the feed to the present ammoxidation process can contain from zero to 8 mole percent of such olefin(s), based on the moles of $C_3$ to $C_4$ paraffins plus olefins fed, and this feed can be from any source. Although larger amounts of $C_3$ to $C_4$ olefins may be present in the substrate paraffin feed, usual amounts are as stated, and the usual olefin is that corresponding to the particular paraffin fed to the reaction zone of the present process.

The nitrile products of the present process contain one C to C double bond and one nitrile group. The desired olefin products contain one double bond and the same number of C atoms as the paraffin feed.

The formula 1 catalysts usually include at least 0.4 atom of W per atom of V. Particularly useful are catalysts of formula 1 containing at least 0.5 atoms of P per atom of V.

Vanadium, phosphorus, tungsten and the optional elements shown in the catalyst formula 1 can be incorporated by methods generally known in the art, using oxides, hydroxides, acids, salts (particularly organic salts such as acetates), and other compounds of such elements. Examples of such incorporation are shown in the specific examples hereinafter.

Tungsten is advantageously incorporated as ammonium meta- or orthotungstate, tungstic acid, or tungsten trioxide. P can be introduced, for instance, as ammonium phosphate or $(NH_4)_2HPO_4$ or phosphoric acid.

The catalyst of formula 1 can, of course, contain oxides of other elements not set forth in formula 1, as long as they do not materially detrimentally affect the catalytic ammoxidation of the paraffin to the desired nitriles. When bismuth is optionally present in oxidized form as part of the catalyst of formula 1, it is usually present in amounts of no more than 0.2 atoms of Bi per atom of V. Usually, catalysts of formula 1 contain essentially no antimony but in any event they never contain more than 0.01 atom of Sb per atom of V.

In the process of the present invention, the reaction is preferably carried out in the gas phase by contacting a mixture of the paraffin, ammonia and a molecular oxygen containing gas, such as air, with a catalyst of the invention contained in a fixed bed, a gravity flowing bed, a fluidized bed or a fast transport reactor mode. It is also possible to include additional diluents such as steam, nitrogen, carbon dioxide or helium.

It should be noted that when operating at ratios of paraffin to oxygen and to ammonia in excess of stoichiometric, as in the present process, 100 percent conversion of paraffin is not even theoretically attainable. However, when so operating, an advantage is that the selectivity of the paraffin to the corresponding nitrile and the corresponding olefin is greatly increased, and the olefin product can be further ammoxidized with $O_2$ and $NH_3$ to make further quantities of the nitrile. Thus, the nitrile and the corresponding olefin are both useful products of the present process. The unreacted olefin and paraffin can, of course, be fed to an ammoxidation step or steps.

The reaction temperature can vary from 400° to 650° C., but is usually 460° to 520° C. The latter temperature ranges are especially useful in the case of propane ammoxidation to acrylonitrile.

The average contact time is usually from 0.02 to 20 seconds, and is more often from 0.2 to 8 seconds, but higher or lower contact times can be used.

The catalysts of formula 1 are essentially free of uranium. Moreover, in the process of the invention, essentially no sulfur or sulfur compounds, or halogen or halogen compounds, are present in the reaction mixture during the ammoxidation.

In the present process in all its embodiments the molar ratio of $O_2$ to $NH_3$ fed to the reaction zone is usually in the range from 1 to 10 (more often 1-5) and the molar ratio of gaseous diluent to alkane or paraffin is usually in the range of zero to 5 (more often zero to 3).

In the preparation of the catalyst composition of formula 2, the metal oxides can be blended together or can be formed separately and then blended or formed separately or together in situ. Promoter oxides can be incorporated into the bismuth-iron-molybdenum based catalyst by blending into the gel before calcining or by blending into the over-dried based catalyst before calcining. A useful manner of incorporating promoter elements is by choosing a water-soluble salt of the promoter element, forming an aqueous solution of the salt, and mixing the solution with a solution or a suspension of the base elements or salts thereof. Optionally, the promoter elements can be incorporated by the use of soluble complex salts or compounds with the desired base elements which upon calcination will yield the desired ratio of the elements in the finished catalyst.

The H elements can be introduced into the formula 2 catalyst as an oxide or as any salt which upon calcination will yield the oxide. Preferred salts are the nitrates which are readily available and easily soluble.

Bismuth may be introduced into the catalyst as an oxide or as any salt which upon calcination will yield the oxide. Most preferred are the water-soluble salts which are easily dispersible within the catalyst and which form stable oxides upon heat-treating. The most preferred salt for introducing bismuth is bismuth nitrate.

To introduce the iron component into the catalyst one can use any compound of iron which, upon calcination, will result in the oxides. As with the other elements, water soluble salts are preferred for the ease with which they may be uniformly dispersed within the catalyst. Most preferred is ferric nitrate. Cobalt and nickel are similarly introduced.

To introduce the molybdenum component any molybdenum oxide such as the dioxide, trioxide, pentoxide or sesquioxide can be used. A preferred starting material is ammonium heptomolybdate.

Other variations in starting materials will suggest themselves to one skilled in the art, particularly when the preferred starting materials mentioned hereinabove are unsuited to the economics of large-scale manufacture. In general, any compounds containing the desired catalyst components may be used provided that they result, upon heating to a temperature within the range disclosed hereinafter, in the oxide.

These formula 2 catalyst compositions are conveniently prepared by slurry techniques wherein an aqueous slurry containing all of the elements in the object catalyst is produced, the water removed from the aqueous slurry to form a precatalyst precipitate or powder and the precatalyst then heated in the presence of an oxygen-containing gas such as air at elevated temperature to calcine the precatalyst thereby forming the catalyst. Liquids other than water, such as $C_1$ to $C_8$ alcohols can also be used to form the precatalyst slurry.

In another aspect, the invention concerns the admixture of the particulate catalyst compositions recited herein per se.

The process of the present invention gives superior results because of the combination of (1) the use of the claimed catalyst mixtures at (2) high ratios of alkane feed in relation to $NH_3$ and molecular oxygen, well in excess of the stoichiometric ratio at which all of the alkane could theoretically be converted to the corresponding mononitrile.

The optional diluent/supports for the formula 1 catalyst and for the formula 2 catalyst can include alumina, silica-alumina, silica, titania, silica-titania, $Nb_2O_5$, silica-niobia, silica-zirconia, zirconia, etc.

In the usual practice of the present invention, the catalyst support/diluent for the catalyst of formula 1 is not an oxide of an element named in formula 1. Further in the usual practice of the invention the catalyst support/diluent for the co-catalyst of formula 2 is not an oxide of an element named in formula 2.

In the catalysts of the invention, the empirical formulas 1 and 2 do not, of course, connote any particular chemical compound, nor indicate whether the elements are present as a mixture of individual oxides or as a complex oxide or oxides, or what separate crystalline phases or solid solutions may be present. Similarly, the designation of certain oxides, such as "silica" or "alumina" or $SiO_2$ or $Al_2O_3$, as supports or diluents is merely in accordance with convention in the inorganic oxide catalyst art, and such designations refer to compounds often regarded as supports in the catalyst art. Such designations, however, do not mean that the element involved is actually present as a simple oxide. Indeed, such elements may at times be present as a complex oxide with one, more than one, or all of the elements in formula 1 or formula 2, which complex oxides form during the precipitation or agglomeration, drying and calcining process for preparing the catalyst composition.

By "particulate mixture" as used herein is meant a mixture of solid particles or subdivided pieces of the first catalyst composition with separate and distinct solid particles of the second catalyst composition. The particles are often of a size used in fluidized bed reactors, say about 40 to 90 microns, but of course larger particles of catalyst can be employed for use in fixed or gravity flowing catalyst beds.

The mixtures of the present catalyst compositions are mixtures of catalysts, not of catalyst precursors. Thus, they are mixtures of catalyst compositions that have been calcined (i.e., heat-treated at the final temperature used for the catalyst preparation).

While particulate catalytic mixtures of formula 1 and formula 2 catalyst compositions are physical mixtures of separate particles of each catalyst composition, pellets or other shapes can be pressed from such particulate mixture to form larger particles for fixed bed operations, etc.

A. N. Shatalova et al. in Neftekhiniya 8, No. 4, 609-612 (1968), describe the reaction of propane with oxygen and ammonia using a large excess of propane and a mixture of two catalysts, one of which is described as oxides of metals having dehydrogenating characteristics, at 550° and 600° C. At 500° C. little or no acrylonitrile was produced. Rather large amounts of propionitrile and acrolein were made per mole of acrylonitrile produced. The per pass conversion of propane to acrylonitrile was generally 2-4 percent with selectivity to acrylonitrile being from 12 to 33 percent.

In copending application Serial No. 222,985, filed July 22, 1988 and in U.S. Pat. No. 4,767,739, issued Aug. 30, 1988 by the present inventors is disclosed the ammoxidation of $C_3$ to $C_5$ paraffins, including propane and isobutane to make nitriles, including acrylonitrile and methacrylonitrile, in the presence of a mixture of (1) an oxidic V and Sb-containing catalyst that can contain both W and P, where the Sb can be present in amounts as low as 0.01 atoms Sb per atom of V and (2) a catalyst having the elements and proportions of the co-catalyst herein.

In our copending application Ser. No. 133,661, filed Dec. 16, 1987 is disclosed the ammoxidation of $C_3$ to $C_4$ paraffins, including propane and isobutane, to make nitriles, including acrylonitrile and methacrylonitrile, in the presence of an oxidic V, Sb and W-containing catalyst that can contain P, where the Sb can be present in amounts as low as 0.01 atoms Sb per atom of V.

The following examples of the invention are exemplary and should not be taken as in any way limiting:

EXAMPLE 1

A catalyst having the composition 25% $VPWO_x$–75% $Al_2O_3$ was made. 8.66g of ammonium metatungstate and 3.75g of $NH_4VO_3$ were dissolved in 200 cc of hot distilled water and 3.66g of 85% $H_3PO_4$ was added. Then 8g of oxalic acid in 50 cc $H_2O$ was added, with stirring for 1 hour at 75° C. Catapal SB alumina (44.12g) was dispersed in 150 cc $H_2O$ and 7g acetic acid and stirred vigorously for 1 hour. The resulting sol was then poured slowly to the V-W-P solution. The resulting slurry was slowly evaporated on a hotplate and finally in a 100° C. oven overnight.

The resulting dried precursor was heat-treated at 350° C. for 5 hours, then a portion calcined at 610° C. for 3 hours.

EXAMPLE 2

A catalyst having the composition 50% $VP_{1.2}Mn_{0.2}WO_x$ - 50% $Al_2O_3$ was made in a manner similar to Example 1, except that Mn was added as $Mn(NO_3)_2$.

EXAMPLE 3

Ammonium heptomolybdate was dissolved in water. Silica sol was added, followed by $CrO_3$. Iron nitrate was melted on a hotplate with a small amount of water. Then, in order, were added manganese, bismuth, magnesium and nickel nitrates, forming a solution that was added to the Mo-Cr-Si solution previously prepared, forming a slurry which was heated on a hotplate with stirring until it started to thicken. It was then dried at 120° C., heated 3 hours at 290° C. and 3 hours at 425° C.

The composition was then ground to 20-35 mesh and heated for 3 hours at 610° C. The catalyst composition was 50% $Mg_2Ni_5Fe_2MnBiCr_{0.5}Mo_{13.2}O_x$ +50% $SiO_2$.

EXAMPLE 4

Ammonium heptamolybdate was dissolved in water. Silica sol was added, followed by $CrO_3$. Iron nitrate was melted on a hotplate with a small amount of water. Then, in order, were added manganese, bismuth, magnesium and nickel nitrates, forming a solution that was added to the Mo-Cr-Si solution previously prepared, forming a slurry which was heated on a hotplate with stirring until it started to thicken. It was then dried at 120° C., heated 3 hours at 290° C. and 3 hours at 425° C.

The composition was then ground to 20-35 mesh and heated for 3 hours at 610° C. The catalyst composition was 50% $MgNi_6Fe_2MnBiCr_{0.5}Mo_{13.2}O_x$ +50% $SiO_2$.

In the ammoxidation runs of the following examples, the catalyst or the catalyst mixture is in a tubular ⅜ inch I.D. stainless steel fixed bed reactor. The reactor is equipped with a preheat leg immersed in a temperature controlled molten salt bath. The gaseous feed components are metered through mass flow controllers into the bottom of the reactor through the preheat leg. Water is introduced through a septum at the top of the preheat leg, using a syringe pump. The feed is fed to the catalyst for the time noted before the runs are started and product is collected and analyzed: the runs of each example last 30-60 minutes.

In the examples, the conversion, yield and selectivity and defined as follows:

$$\text{conversion} = \frac{\text{moles paraffin reacted}}{\text{moles paraffin charged}} \times 100\ (\%)$$

$$\text{yield} = \frac{\text{moles product produced}}{\text{moles paraffin charged}} \times 100\ (\%)$$

$$\text{selectivity} = \frac{\text{moles product produced}}{\text{moles paraffin reacted}} \times 100\ (\%)$$

COMPARATIVE EXAMPLE A

In this example, the catalyst was the catalyst of Example 1. The reaction temperature was 470° C. and the molar feed ratios were 5 propane/1 $NH_3$/2 $O_2$/1 $H_2O$. The contact time was 0.3 seconds. Analysis of the reactor effluent showed that propane conversion was 20.9 percent; yield and selectivity of propane to acrylonitrile were 2.1 and 10 percent, respectively; yield and selectivity to propylene were 10.6 percent and 50.9 percent, respectively.

EXAMPLE 5

In this example, the catalyst was a mixture of the catalyst of Example 1 and the catalyst of Example 4 in the weight ratio of the former to the latter of 0.036. The reaction temperature was 470° C. and the molar feed ratios were 5 propane/1 $NH_3$/2 $O_2$/1 $H_2O$. The contact time was 1.7 seconds. The pre-run time was 48 hours. Analysis of the reactor effluent showed that propane conversion was 11.0 percent; yield and selectivity of propane to acrylonitrile were 5.1 and 46.0 percent, respectively; yield and selectivity to propylene were 0.7 and 6.6 percent, respectively.

EXAMPLE 6

In this example, the catalyst was a mixture of the catalyst of Example 2 and the catalyst of Example 3 in the weight ratio of the former to the latter of 0.15. The reaction temperature was 470° C. and the molar feed ratios were 5 propane/1 $NH_3$/2 $O_2$/1 $H_2O$'The contact time was 1.6 seconds. The pre-run time was 96 hours. Analysis of the reactor effluent showed that propane conversion was 12.5 percent; yield and selectivity of propane to acrylonitrile were 5.3 and 42.7 percent, respectively; yield and selectivity to propylene were 0.8 and 6.5 percent, respectively.

As will be evident to those skilled in the art, various modifications of this invention can be made or followed in the light of the foregoing disclosure and discussion without departing from the spirit and scope of the disclosure or from the scope of the claims.

We claim:

1. A process for making an $\alpha,\beta$-unsaturated mononitrile by the catalytic reaction in the vapor phase of a paraffin selected from propane and isobutane with molecular oxygen and ammonia and optionally a gaseous diluent, by catalytic contact of the foregoing reactant in a reaction zone with an intimate particulate mixture of a first catalyst composition and a second catalyst composition, said feed to the reaction zone containing a mole ratio of said paraffin:$NH_3$ in the range from 2 to 16 and a mole ratio of said paraffin to $O_2$ in the range from 1 to 10, said first catalyst composition being 0-99 weight percent of a diluent/support and 100-1 weight percent of a catalyst having the components in the proportions indicated by the empirical formula:

$$VP_pW_wA_aD_dC_cT_tO_x \text{ (formula)}$$

where
A is one or more of Sn, Mo, B and Ge;
D is one or more of Fe, Co, Ni, Cr, Pb, Mn, Zn, Se, Te, Ga, Zr, In and As;
C is one or more of an alkali metal and Tl;
T is one or more of Ca, Sr, Mg and Ba; and
where a is 0-10;
d is 0-10;
c is 0-1;
t is 0-10;
p is 0.1-20;
w is 0.2-10;
the ratio (a+c+d+t+w):(1+p) is no more than 6; x is determined by the oxidation state of the other elements present; and no more than 2 atoms of Mo are present per atom of V; said second catalyst composition being 0-99 weight percent of a diluent/support and 100-1 weight percent of a catalyst having the components in the proportions indicated by the empirical formula:

$$Bi_kFe_lMo_{12}H_hE_eF_fG_gO_x \text{ (formula 2)}$$

where
H is one or more of an alkali metal, Sm, Ag
E is one or more of Mn, Cr, Cu, V, Zn, Cd, La,
F is one or more of P, As, Sb, Te, W, B, Sn, Pb, Se
G is one or more of Co, Ni, alkaline earth metal and
K is 0.1-12,
l is 0.01-12,
h is 0-0.5,
e is 0.10,
f is 0-10,
g is 0-12,
k+l+h+e+f+g≦24, and
x is a number determined by the valence requirements of the other elements present, wherein the weight ratio in said mixture of said first catalyst composition to said second catalyst composition is in the range of 0.001 to 2.5.

2. A process of claim 1 wherein said formula 1 catalyst contains at least 0.4 atom of W per atom of V.

3. A process of claim 1 wherein said formula 1 catalyst contains at least 0.5 atom of P per atoms of V.

4. A process of claim 2 wherein said formula 1 catalyst contains at least 0.5 atom of P per atom of V.

* * * * *